United States Patent [15] 3,685,419
Imai [45] Aug. 22, 1972

[54] MECHANISM FOR COUPLING THE EXPOSURE METER TO THE APERTURE DIAPHRAGM CONTROL MEANS IN AN INTERCHANGEABLE LENS OF A SINGLE-LENS REFLEX CAMERA

[72] Inventor: Tadayuki Imai, Tokyo, Japan
[73] Assignee: Kabushiki Kaisha Ricoh, Tokyo, Japan
[22] Filed: May 17, 1971
[21] Appl. No.: 144,063

[30] Foreign Application Priority Data

May 26, 1970 Japan.....................45/44988

[52] U.S. Cl..........................95/64 R, 95/10 C, 95/42
[51] Int. Cl............................G03b 7/12, G03b 17/14
[58] Field of Search..............95/10 C, 42, 64 R, 64 B

[56] References Cited

UNITED STATES PATENTS

| | | |
|---|---|---|
| 3,598,036 | 8/1971 | Suzuki...................95/10 C X |
| 3,532,036 | 10/1970 | Nakamura et al......95/64 R X |
| 3,495,514 | 2/1970 | Nakamura et al..........95/10 C |
| 3,447,431 | 6/1969 | Kiper.....................95/64 B X |
| 3,352,220 | 11/1967 | Lang et al.................95/10 C |
| 3,082,672 | 3/1963 | Swarofsky et al..........95/10 C |

Primary Examiner—Joseph F. Peters
Attorney—Milton J. Wayne and Erwin Koppel

[57] ABSTRACT

A ring for coupling an exposure meter to an aperture stop control means is disposed on the body of a single-lens reflex camera employing the screw-in type interchangeable lenses and is rotatable about the optical axis of the lens, and a clutch lever is rotatably fixed to this coupling ring. The free end of the clutch lever engages with a projection of a shutter release lever in such a way that the clutch lever is normally moved away from a horizontal coupling arm of an aperture stop control ring which is disposed in the lens and is provided with an aperture stop control cam, so long as the shutter release lever is not depressed or moved downwardly. Therefore, when the lens is mounted, the horizontal coupling arm will not engage with the clutch lever, so that the lens may be mounted and dismounted freely. Upon depression of the shutter release lever, the clutch lever moves into mechanical or frictional engagement with the coupling arm, and when the shutter release lever is further depressed the coupling ring is rotated through an angle corresponding to the angle of displacement of the pointer of the exposure meter so that the clutch lever rotates the control ring in unison with the coupling ring.

3 Claims, 1 Drawing Figure

PATENTED AUG 22 1972
3,685,419
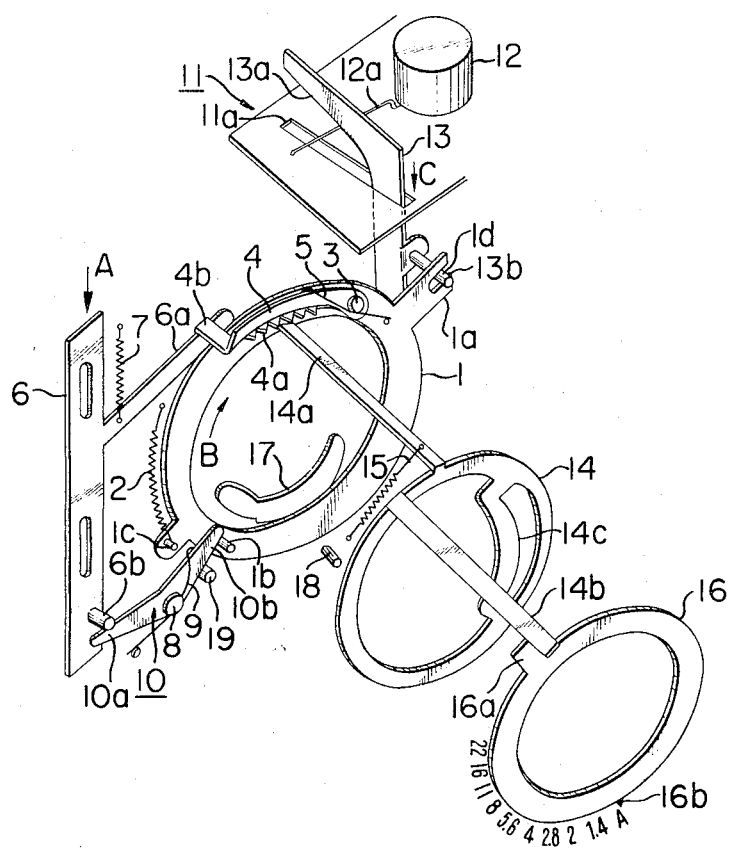

MECHANISM FOR COUPLING THE EXPOSURE METER TO THE APERTURE DIAPHRAGM CONTROL MEANS IN AN INTERCHANGEABLE LENS OF A SINGLE-LENS REFLEX CAMERA

BACKGROUND OF THE INVENTION

The present invention relates to a mechanism for use in a single-lens reflex camera employing screw-in mount type lenses drivingly coupling the displacement of a pointer of an exposure meter to an aperture control means in an interchangeable lens.

In a single-lens reflex camera employing screw-in mount type interchangeable lenses, the finally mounted positions of the lenses are somewhat different from one another or displaced from the correct or reference position so that the correct coupling between the exposure meter incorporated in the camera body and the aperture stop control means incorporated in the lens barrel of the interchangeable lens is very difficult to attain. Therefore the single-lens reflex cameras generally employ an exposure setting by means of a stopping down system or an exposure control system by needle matching, and there has not been proposed a single-lens reflex camera of the type having a mechanism coupling the exposure meter on the camera body to the aperture control means incorporated in the interchangeable lens.

SUMMARY OF THE INVENTION

Briefly stated, one of the objects of the present invention is to provide a new and novel mechanism for use with a single-lens reflex camera which normally disconnects the coupling ring, which is incorporated in the camera body and is rotated in response to the deflection of the pointer of the exposure meter, from the aperture stop control ring incorporated in the interchangeable lens, but drivingly couples them when the shutter release button is depressed, in such a way to be positively coupled to each other regardless of the difference in relative position therebetween due to the machining errors of the screw threads of the male and female lens mounts.

Another object of the present invention is to accomplish the above and other objects by a mechanism simple in construction.

According to one aspect of the present invention, a ring drivingly coupled to an exposure meter is disposed on the camera body for rotation about the optical axis of a taking lens, and a clutch lever is rotatably fixed to this coupling ring. When the shutter release lever is moved downwardly the clutch lever is drivingly coupled to an aperture stop control ring incorporated in an interchangeable lens to rotate the control ring as will be more fully described hereinafter. The free end of the clutch lever is engagable with a projection extending from the shutter release lever in such a way that so long as the shutter release lever is not moved downwardly or depressed, the clutch lever is moved away from a coupling arm extending from the aperture stop control ring. However, upon depression of the shutter release lever, the clutch lever is actuated to rotate in one direction to mechanically or frictionally engage with the coupling arm, and when the shutter release lever is further depressed, the coupling ring is rotated through an angle depending upon the displacement of the pointer of the exposure meter so that the clutch lever rotates the aperture stop control ring in unison with the coupling ring. Therefore the aperture stop control cam of the aperture stop control ring may be precisely displaced to adjust the aperture stop in response to the deflection of the pointer of the exposure meter.

Because of the machining errors of the screw threads of the male and female lens mounts, the relative position in the direction of rotation between the coupling ring and the aperture stop control ring is different from one interchangeable lens mount to another so that the position at which the clutch lever drivingly couples to the coupling arm of the aperture stop control ring becomes different accordingly. However according to the present invention, the difference in relative position is so compensated that it will not adversely affect the precise adjustment of an aperture control by the aperture stop control ring. That is, the length of the clutch lever along which it may engage with the coupling arm is selected to be longer than the range in which the difference in relative position between the clutch lever and the coupling arm occurs.

When the lens is mounted or dismounted, the clutch lever is placed in a position at which it will not contact with the coupling arm of the aperture control ring in the lens so that the mounting and dismounting of the interchangeable lenses may be smoothly effected.

The above and other objects, advantages and features of the present invention will become more apparent from the following description of the preferred embodiment thereof taken in conjunction with the accompanying drawing.

BRIEF DESCRIPTION OF THE DRAWING

The single FIGURE is an exploded perspective view of a mechanism for coupling an exposure meter of a single-lens reflex camera to an aperture stop control means in an interchangeable lens mounted on the camera.

DESCRIPTION OF THE PREFERRED EMBODIMENT

A rotary coupling ring 1 fixed to a camera body proper for rotation about an optical axis has a bifurcated projection 1a, and pins 1b and 1c integrally formed therewith and angularly spaced apart from each other. A clutch lever 4 rotatably fixed to the coupling ring 1 at 3 has a saw-tooth-shaped portion 4a and a horizontally bent portion or projection 4b, and a spring 5 is loaded between the ring 1 and the clutch lever 4 to bias the latter to rotate in the counterclockwise direction about pin 3. A spring 2 is loaded between the pin 1c of the ring 1 and the camera body or a fixed member (not shown) to bias the ring to rotate in the clockwise direction.

A release lever 6 is vertically slidably fixed to the camera body and is normally biased upwardly under the force of a spring 7 loaded between a horizontally extended arm 6a of the release lever 6 and the camera body or fixed member. The free end of the horizontal arm 6a is engagable with the undersurface of the projection 4b of the clutch lever 4, and the spring 7 is stronger than the spring 5 so that the clutch lever 4 is biased to normally rotate in the clockwise direction, but is rotated in the counterclockwise direction when the release lever 6 is pushed downward against the spring 7. A pin 6b extending from the lower end of the release lever 6 is in engagement with one end 10a of a lever 10 which is pivotably fixed to the camera body by a pivot 8 and is loaded with a spring 9 which is stronger than the spring 2. The other end of the lever 10 is engagable with the pin 1b of the ring 1.

An exposure meter 12 is securely fixed to an exposure base plate 11 which in turn is securely fixed to the camera body and is provided with an elongated slot 11a. An aperture-stop-setting cam lever 13 vertically movably extends through this elongated slot 11a and a pointer 12a of the exposure meter is interposed between a cam surface 13a of the cam lever 13 and the elongated slot 11a. A pin 13b of the cam lever 13 is fitted into the slot 1d in the bifurcated projection 1a of the ring 1.

An aperture-stop-control ring 14 fixed in the lens barrel (now shown) for rotation about the optical axis is loaded with a spring 15 which is weaker than the spring 2, and is provided with integrally formed horizontal coupling arms 14a and 14b extending in opposite directions as shown in the figure and an aperture stop control cam 14c. An aperture stop is selected depending upon the angular position of the aperture stop control cam 14c. The free end of the horizontal arm 14a contacts with the teeth 4a of the clutch lever 4 and is arranged to move within a range corresponding to the length of the toothed portion 4a.

An aperture-stop index ring 16 is fixed also to the lens barrel for rotation about the optical axis and its projection 16a is engagable with the free end of the horizontal coupling arm 14b of the aperture stop control ring 14. An index 16b marked on the index ring 16 serves to select a desired aperture stop or F-stop from 1.4 – 22 and A which denotes the "automatic" adjustment of exposure.

An aperture control lever 17 fixed to the camera body is of the conventional type which is slidable in the direction in parallel with the optical axis to displace an aperture stop control pin 18. The rotation of the lever 10 in the clockwise direction is controlled by a stop 19.

Next the mode of operation will be described. When an interchangeable lens is screwed into the camera body, the clutch lever 4 is located in such a position that it does not contact with the free end of the horizontal coupling arm 14a of the control ring 14 so that the interchangeable lens may be easily mounted on the camera. When the release lever 6 is depressed against the spring 7 in the direction of the arrow A with the index ring 16 rotated to have its index 16b aligned with the mark "A," the clutch lever 4 is rotated in the counterclockwise direction under the force of the spring 5 to have its toothed portion 4a move into engagement with the free end of the horizontal coupling arm 14a of the control ring 14 because the projection 6a is moved away from the projection 4b of the clutch lever 4. The pin 6b of the release lever 6 pushes downwardly on the one end 10a of the lever 10 to rotate it in the counterclockwise direction against its spring 9, so that the coupling ring 1 rotates in unison with the control ring 14 in the clockwise direction indicated by the arrow B under the force of the spring 2 while the free end of the horizontal arm 14a of the control ring 14 is retained in engagement with the toothed portion 4a of the clutch lever 4. In consequence the pin 13b in the slot 1d of the bifurcated projection 1a of the ring 1 is caused to move downwardly, so that the aperture cam lever 13 is also moved downwardly in the direction indicated by the arrow C. Therefore the cam surface 13a of the lever 13 presses the pointer 12a against the base plate 11, so that the cam lever 13, the ring 1 and the control ring 14 are stopped at the positions which are determined depending upon the deflection angle of the pointer 12a. When the release lever 6 is further depressed, a reflecting mirror drive lever (not shown) is actuated so that the reflecting mirror (not shown) is moved away from the optical path to a film plane (not shown) by a conventional mechanism (not shown). Simultaneously, the aperture control pin 18 is displaced by the aperture control lever 17 so that an appropriate F stop is selected depending upon the brightness of the subject measured by the exposure meter 12, and by the cam 14c of the aperture stop control ring 14. Thereafter a shutter (not shown) is opened.

In order to compensate for displacement of the interchangeable lens from the correct or reference mounting position, the lateral length of the toothed portion 4a of the clutch lever 4 is selected to cover this displacement or difference in mounted position and teeth with a small pitch are formed. Alternatively, other suitable friction couplings may be provided between the clutch lever 4 and the horizontal coupling arm 14a of the control ring 14. Therefore, the angle of rotation of the ring 1 can be made precisely equal to that of the aperture stop control ring 14 which in turn is rotated through a1 angle depending upon the displacement of the pointer 12a.

When the index ring 16 is rotated to select a desired aperture stop, the projection 16a pushes the horizontal arm 14b to rotate the control ring 14 independently of the displacement of the pointer 12a. Thus, the aperture may be manually controlled.

From the foregoing description, it is seen that even when the mounted interchangeable lens is displaced somewhat from the correct position, the coupling ring 1 on the side of the camera body may be positively coupled to the aperture stop control ring 14 and aperture stop index ring 16 on the side of the lens barrel so that the so-called "EE" drive becomes possible even in the cameras employing the screw-in type interchangeable lenses. In addition, the coupling device of the present invention is simple in construction and is advantageously used with the conventional interchangeable lenses which, require only a small modification.

What is claimed is:

1. A mechanism for coupling an exposure meter to an aperture stop control ring for single-lens reflex cameras employing screw-in type interchangeable lenses, comprising
   a coupling ring which is disposed on a camera body and in response to the movement of a shutter release lever is rotated through an angle which is dependent upon an angle of deflection of a pointer of an exposure meter;
   a clutch lever rotatably fixed to said coupling ring and drivingly coupled to said shutter release lever;
   an aperture stop control ring disposed in a lens barrel for rotation about an optical axis thereof;

means disposed on said clutch lever and adapted to releasably engage with an arm of said aperture stop control ring in response to the actuation of said clutch lever;

said clutch lever being normally in engagement with said shutter release lever, but out of engagement with said aperture stop control ring, and being adapted to rotate to engage with said aperture stop control ring in response to a first downward stroke of said shutter release lever; and sad coupling ring being adapted ro rotate in unison with said aperture stop control ring in response to a second downward stroke of said shutter release lever through an angle corresponding to the angle of deflection of a pointer of the exposure meter.

2. A mechanism as set forth in claim 1 wherein the length of said means for releasably engaging with said aperture stop control ring is selected to be longer than the displacement of said aperture stop control ring from a reference position caused by the machining errors of the screw threads of the lens mount.

3. A coupling mechanism as set forth in claim 1 wherein said clutch lever is provided with a portion which engages with said arm of said aperture stop control ring over the screw-tin type lens mounting tolerance whereby said tolerance may be compensated.

* * * * *